US006785757B2

(12) United States Patent
Hatsumoto

(10) Patent No.: US 6,785,757 B2
(45) Date of Patent: Aug. 31, 2004

(54) GPS RECEIVING SYSTEM, GPS RECEIVER AND RECORDING MEDIUM FOR USE IN THE GPS RECEIVING SYSTEM

(75) Inventor: Shintaro Hatsumoto, Sakura (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 09/811,441

(22) Filed: Mar. 20, 2001

(65) Prior Publication Data

US 2002/0016881 A1 Feb. 7, 2002

(30) Foreign Application Priority Data

Aug. 7, 2000 (JP) .......................................... 2000-237959

(51) Int. Cl.[7] ........................... G06F 13/14; G01C 21/26
(52) U.S. Cl. ..................... 710/305; 701/213; 342/357.1
(58) Field of Search ............................. 710/8, 313, 105, 710/106, 305; 701/33, 200, 213; 709/217, 224; 342/357.1, 357.06, 357.12; 340/310.01

(56) References Cited

U.S. PATENT DOCUMENTS 6,453,237 B1 * 9/2002 Fuchs et al. ................. 701/213
6,563,418 B1 * 5/2003 Moon ..................... 340/310.01
6,584,404 B1 * 6/2003 McBurney et al. ......... 701/213
6,593,878 B2 * 7/2003 Fall ......................... 342/357.1

FOREIGN PATENT DOCUMENTS

| JP | 07294624 | 11/1995 |
| JP | 10026660 | 1/1998 |
| JP | 10115676 | 5/1998 |

* cited by examiner

Primary Examiner—Khanh Dang
(74) Attorney, Agent, or Firm—Antonelli, Terry, Stout & Kraus, LLP

(57) ABSTRACT

A Global Positioning System (GPS) receiving system, a GPS receiver and a recording medium for use in the GPS receiving system. The GPS receiving system includes a plurality of GPS receivers having GPS antennas mounted thereto, a GPS data processing apparatus, and a cable for connection between the plurality of GPS receivers and GPS data processing apparatus. The GPS receiver is provided with a LAN I/F other than a RS-232C communication port in its input/output I/F. The input/output I/F is provided with, for example, a Ethernet I/F. A program for causing a computer to execute a function of externally receiving an initializing command and a data acquisition command for the GPS receiver via the input/output I/F to control the GPS receiver is recorded in the computer-readable recording medium.

11 Claims, 5 Drawing Sheets

GPS RECEIVING SYSTEM, GPS RECEIVER AND RECORDING MEDIUM FOR USE IN THE GPS RECEIVING SYSTEM

BACKGROUND OF THE INVENTION

The present invention relates to a GPS receiving system, a Global Positioning System (GPS) receiver and a recording medium therefor and more particularly, to an input/output interface (I/F) structure of the GPS receiver and input/output I/F software therefor. The present invention also concerns a structure of a position measuring data network for a GPS application system, a method for wiring a network, and an operating system of operational control.

In a conventional PGS receiver, RS-232C for one-to-one communication has been supported as an input/output I/F, thereby realizing data transmission and reception. In this way, the conventional receiver only supports the RS-232C of the one-to-one communication. Thus when it is desired to form a monitor system for performing position monitoring operation with use of a plurality of GPS receivers, it has been necessary to connect a personal computer (PC) with the receivers each in a one-to-one (1:1) connection relationship therewith with use of a card with a plurality serial ports or to connect a plurality of PC's with the receivers each in a one-to-one connection relationship, as shown in FIGS. 9A, 9B, 10A and 10B. For this reason, RS-232C cables corresponding in number to the GPS receivers become necessary and it is required to record or log GPS data at upper-level computers having a plurality of RS-232C ports or to connect the GPS receivers with upper-level computers corresponding in number to the GPS receivers in a one-to-one connection relationship for logging of the GPS data. Further, this also involves a high cost for the system formation since a cable pipe for housing the RS-232C serial cables inevitably must be made large, etc.

Use of an input/output interface (I/F) other than the RS-232C has been suggested. For example, refer to JP-A-10-115676, JP-A-10-26660 and JP-A-7-294624. However, any of these proposals fails to use a plurality of GPS receivers in a system. Further, when GPS receivers are used in a communication network such as Ethernet typical of LAN, it is necessary to additionally provide a protocol converter between TCP/IP and RS-232C. And when a GPS receiver having only a 10 BASE-T port is used, the LAN becomes of a star type connection and thus LAN cables are concentrated on a hub part. For this reason, when GPS receivers are used for long-distance linearity monitoring such as monitoring of continuous wall surface, the number of cables to be bound becomes many and a thick electric pipe therefor becomes necessary as in the case of routing RS-232C cables, thus resulting in a high cost for system formation.

FIGS. 9A and 9B show an arrangement of a system as a prior art 1 of an RS-232C one-to-one connection type, e.g., for realizing wall surface linearity monitoring by means of RS-232C connection. FIG. 9A shows an arrangement when one-to-one connection is realized with use of a card having a plurality of serial ports, while FIG. 9B shows an arrangement when one-to-one connection is realized with use of a plurality of PC's. The former is the system configuration when a PC 3' for GPS data logging is connected to GPS receivers 1a' to 1d' having GPS antennas 2a' to 2d' via RS-232C cables 5a' to 5d' respectively. When the second, third and fourth GPS receivers 1b', 1c' and 1d' are connected with use of the RS-232C cables 5b' to 5d' of 1:1 communication, this means that the necessary number of such cables corresponds to the number of such GPS receivers, which makes it difficult to form a system since the laying of cables is restricted, the PC 3' is required to have a plurality of serial ports, etc. Further, the maximum number of such GPS receivers capable of being connected to the number of serial ports is restricted, which becomes demerit upon formation of the system. In the latter case, the PC's 3a' to 3d' are required by the number corresponding to the number of such GPS receivers 1a' to 1d', which results in a high cost formation of the system as a demerit.

FIGS. 10A and 10B show, as a system of a prior art 2, a system based on external hub connection of 10 BASE-T, e.g., a system configuration for realizing wall surface linearity monitor. In the present configuration, a separate hub 42' is required. In addition, like the case of using the RS-232C cables 5', cables corresponding in number to the GPS receivers are required in wiring between the hub 42' and respective GPS receivers 1a', limiting the laying of the cables.

SUMMARY OF THE INVENTION

The present invention is to solve problems in the prior art, and an object of the invention is to provide a GPS receiving system, GPS receiver and recording medium, which can use a communication scheme not subjected to 1:1 communication restriction when GPS is used in such a monitor system as to perform position monitoring with use of a plurality of GPS receivers, and which can realize wiring saving of LAN cables upon formation of a LAN.

In accordance with an aspect of the present invention, there is provided a GPS receiving system which has a plurality of GPS receivers having GPS antennas thereon, a GPS data processing apparatus, and cables for connection between the GPS receivers and GPS data processing apparatus, said GPS receivers each having a LAN I/F other than an RS-232C communication port provided in an input/output I/F.

In an embodiment, the above GPS receiver has an Ethernet I/F in the input/output I/F.

And in an embodiment, the above GPS receiver incorporates a hub having 10BASE-T and 10BASE-2.

Further, in an embodiment, the above GPS receiver has a CAN I/F in the input/output I/F.

In an embodiment, the above GPS receiver also has software which externally receives an initializing command and a data acquisition command to the GPS receiver via the LAN I/F of the input/output I/F to control the GPS receiver.

In accordance with another aspect of the present invention, there is provided a GPS receiver for use in a GPS receiving system which includes a plurality of such GPS receivers having GPS antennas mounted thereto, a GPS data processing apparatus and cables for connection between the GPS receivers and GPS data processing apparatus, the GPS receiver having an Ethernet I/F in a LAN I/F.

In accordance with a further aspect of the present invention, there is provided a GPS receiver for use in a GPS receiving system which includes a plurality of such GPS receivers having GPS antennas mounted thereto, a GPS data processing apparatus and cables for connection between the GPS receivers and GPS data processing apparatus, the GPS receiver having a CAN I/F in a LAN I/F.

In accordance with a still further aspect of the present invention, there is provided a recording medium for use in a GPS receiving system which includes a plurality of such GPS receivers having GPS antennas mounted thereto, a GPS data processing apparatus and cables for connection between the GPS receivers and GPS data processing apparatus, a program being provided to cause a computer to perform a function of externally receiving an initializing command and a data acquisition command to the GPS receiver to control the GPS receiver, the program being recorded in the recording medium to be read by the computer.

DESCRIPTION OF THE EMBODIMENTS

Embodiments of the present invention will be explained by referring to accompanying drawings.

Figure 1A:
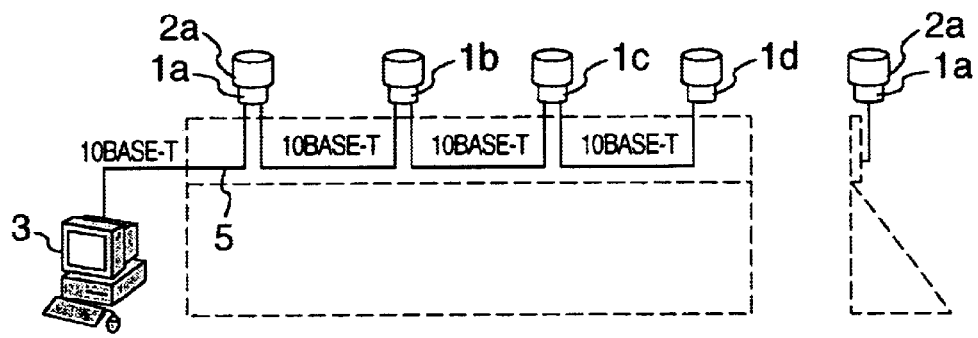
FIGS. 1A and 1B are front and cross-sectional views for explaining a GPS receiving system in accordance with an embodiment 1 respectively.
Figure 1B:
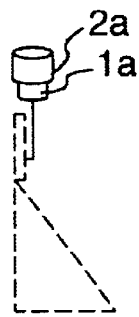
Figure 2:
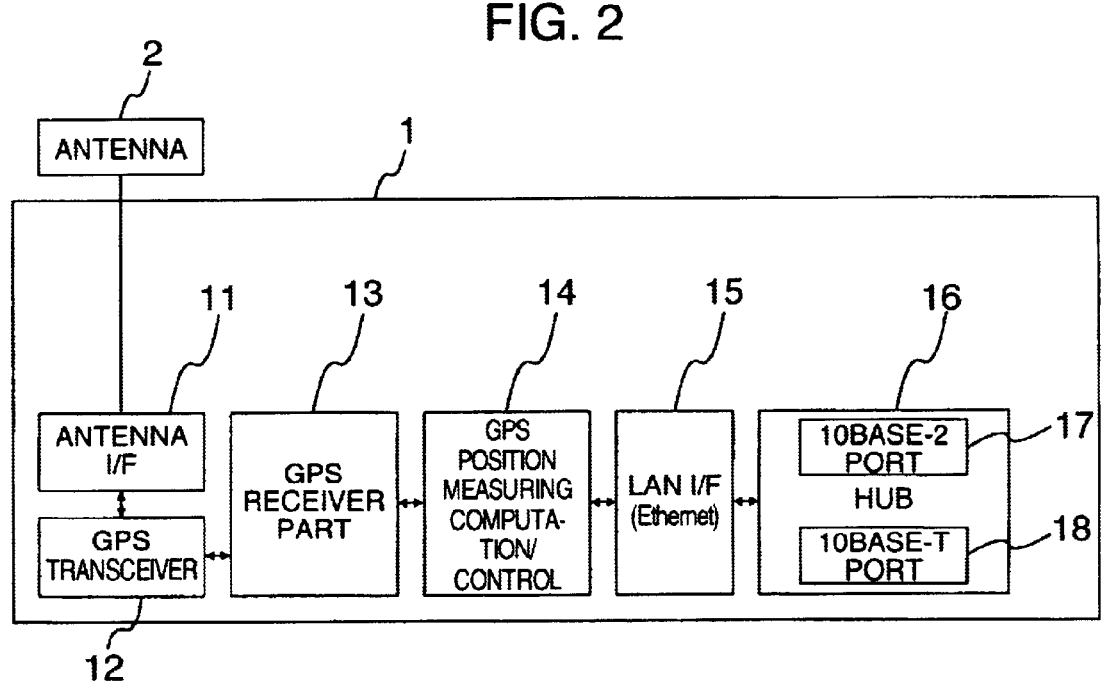
FIG. 2 is a block diagram of an exemplary GPS receiver for use in the embodiment 1.
Figure 3:
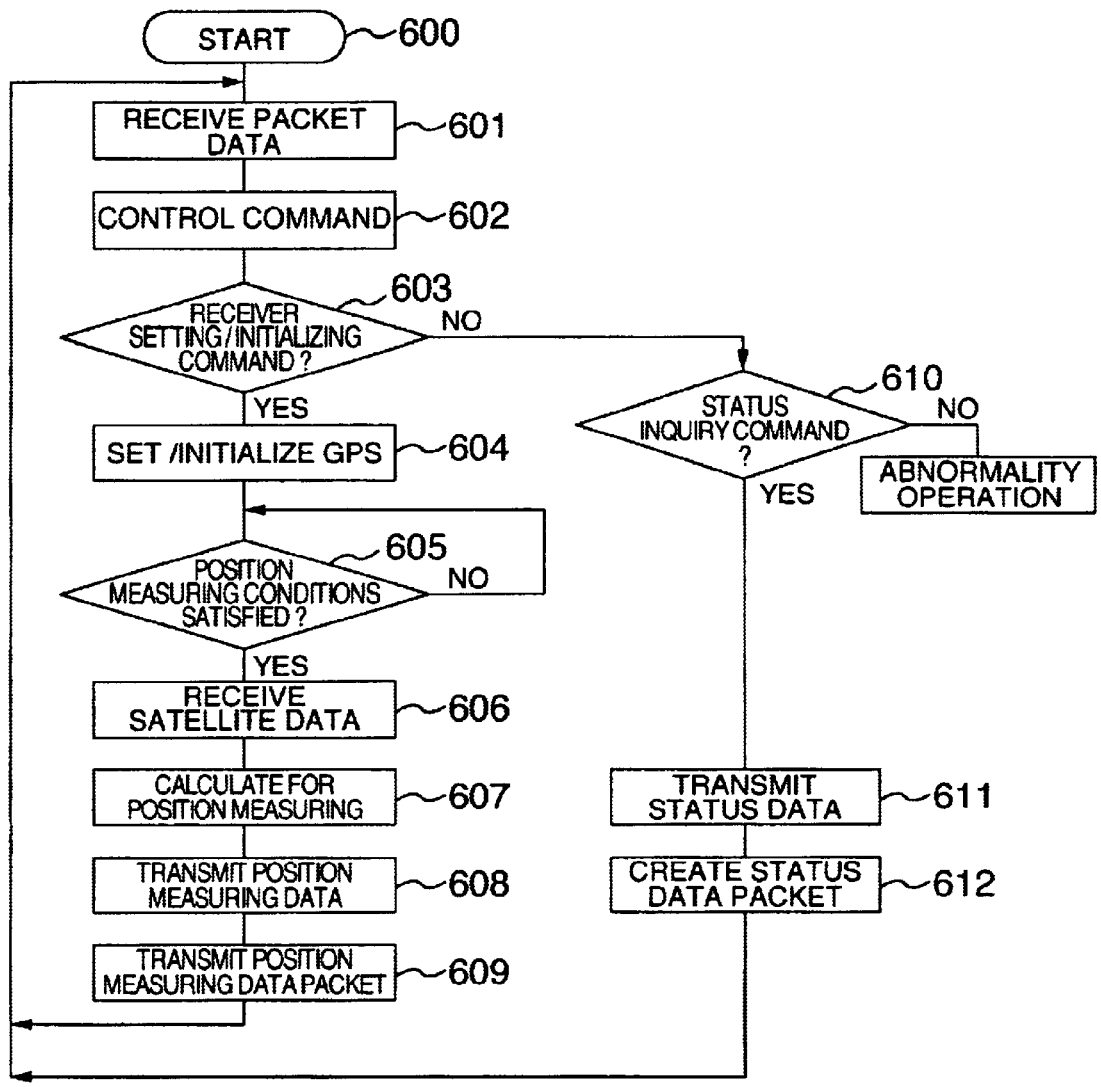
FIG. 3 is a flowchart of data processing operations of the GPS receiver in the embodiment 1.
Figure 4:
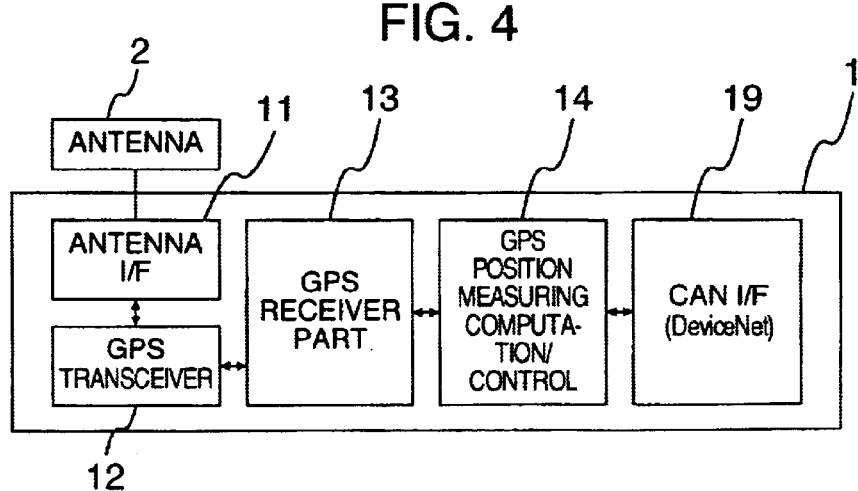
FIG. 4 is a block diagram of another exemplary GPS receiver for use in the embodiment 1.
Figure 5A:
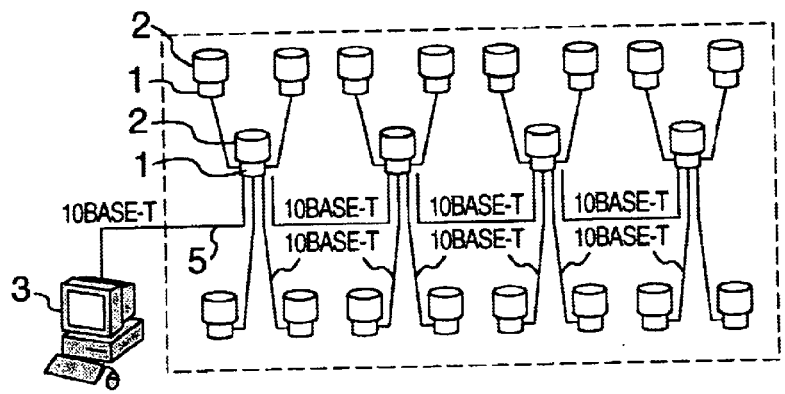
FIGS. 5A and 5B are front and cross-sectional views of a GPS receiving system in accordance with an embodiment 2 respectively.
Figure 5B:
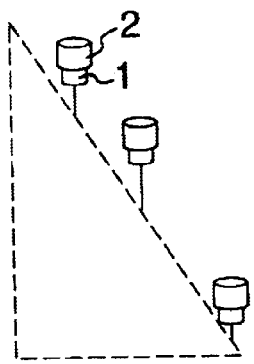
Figure 6A:
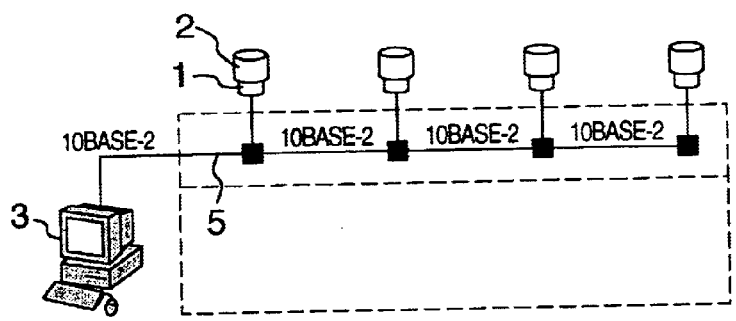
FIGS. 6A and 6B are front and cross-sectional views of a GPS receiving system in accordance with an embodiment 3 respectively.
Figure 6B:
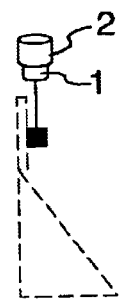
Figure 7A:
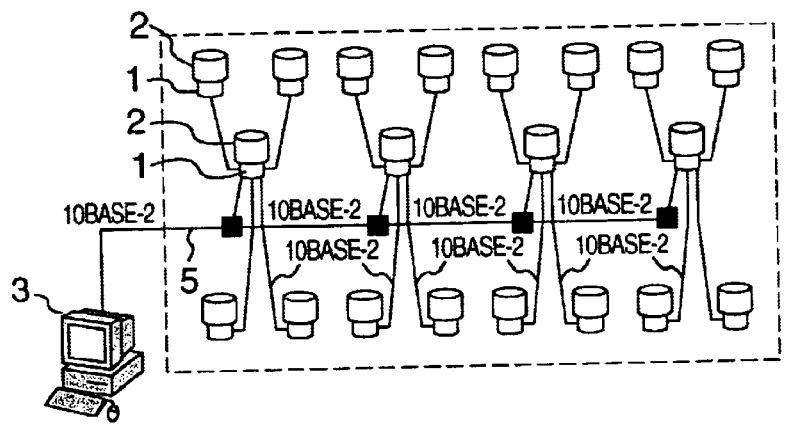
FIGS. 7A and 7B are front and cross-sectional views of a GPS receiving system in accordance with an embodiment 4 respectively.
Figure 7B:
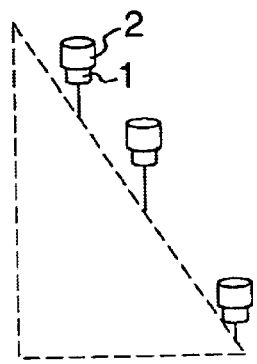
Figure 8:
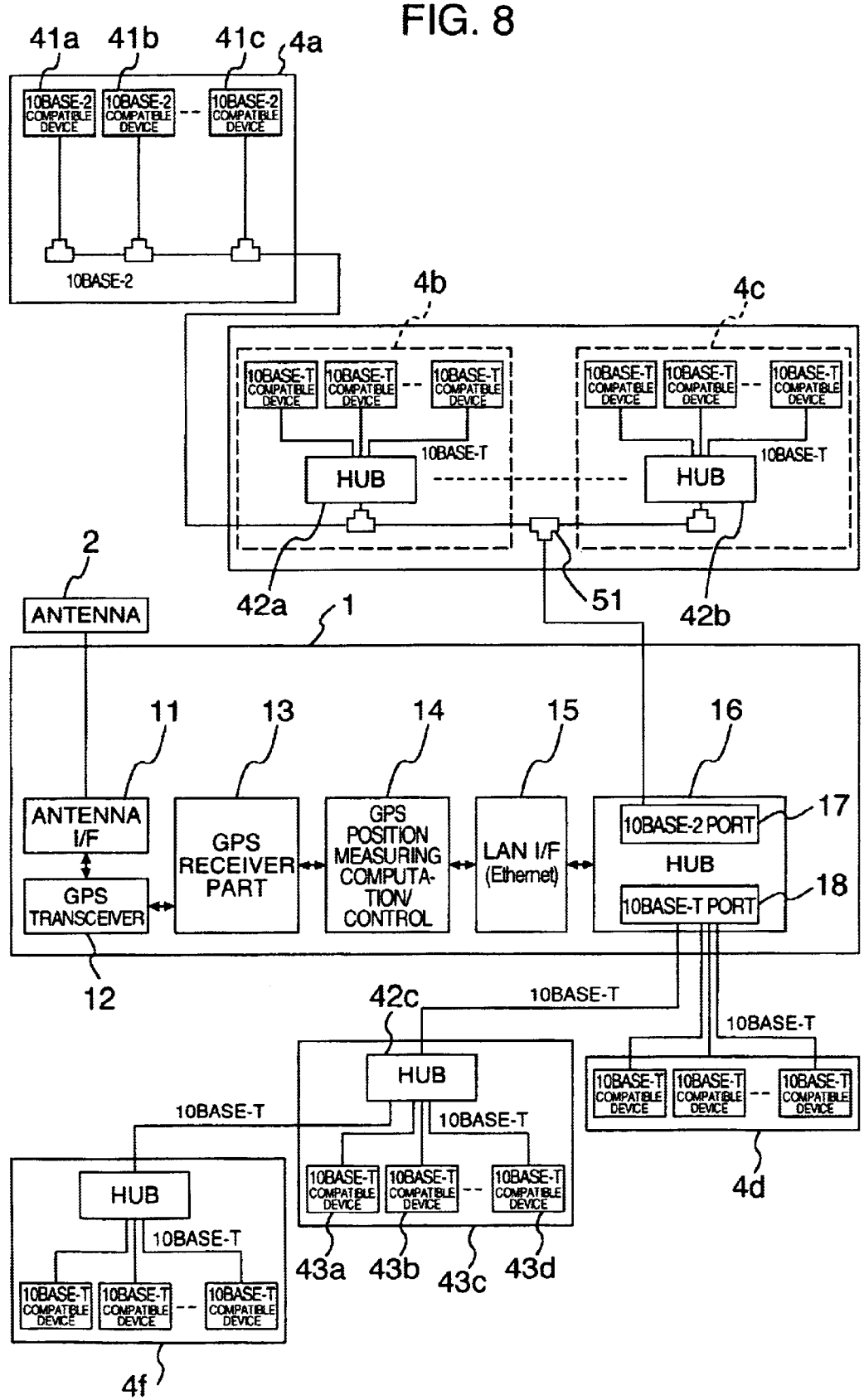
FIG. 8 is a block diagram of a GPS receiving system in accordance with an embodiment 5.
Figure 9A:
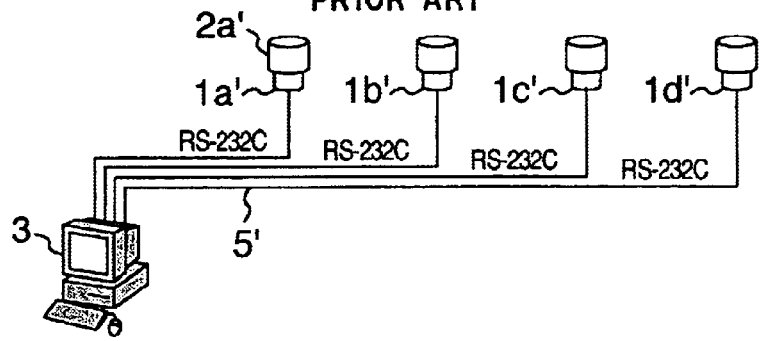
FIGS. 9A and 9B are diagrams for explaining GPS receiving systems as a prior art 1 respectively.
Figure 9B:
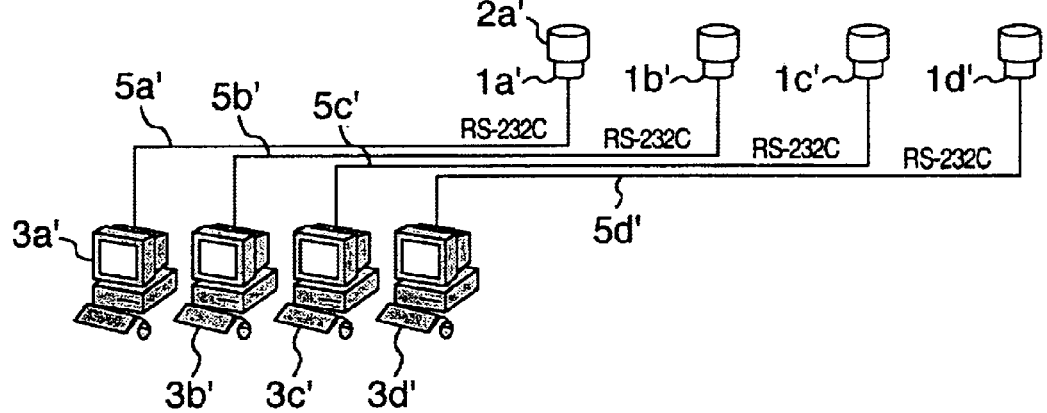
Figure 10A:
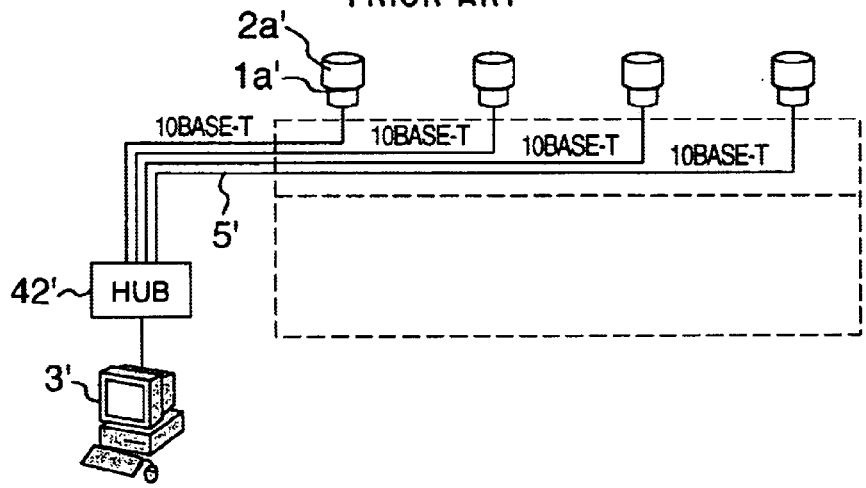
FIGS. 10A and 10B are front and cross-sectional views of a GPS receiving system as a prior art 2 respectively.
Figure 10B:
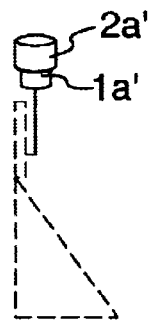

Explanation will be made as to embodiments of the present invention with use of FIGS. 1 to 8. FIGS. 1A and 1B show front and cross-sectional views of a GPS receiving system in accordance with an embodiment 1 respectively. FIG. 2 is a block diagram of an exemplary GPS receiver for use in the embodiment 1. FIG. 3 is a flowchart of data processing operations of the GPS receiver for use in the embodiment 1. FIG. 4 is a block diagram of another exemplary GPS receiver for use in the embodiment 1. FIGS. 5A and 5B show front and cross-sectional views of a GPS receiving system in accordance with an embodiment 2 respectively. FIGS. 6A and 6B show front and cross-sectional views of a GPS receiving system in accordance with an embodiment 3 respectively. FIGS. 7A and 7B show front and cross-sectional views of a GPS receiving system in accordance with an embodiment 4 respectively. FIG. 8 is a block diagram of a GPS receiving system in accordance with an embodiment 5.

Explanation will be made as to the embodiment 1. The GPS receiving system of the present embodiment includes a plurality of GPS receivers 1a, 1b, 1c and 1d, a GPS data processing apparatus such as a personal computer (PC) 3, and a cable 5 which is connected with 10BASE-T built-in hubs, as shown in FIGS. 1A and 1B. FIGS. 1A and 1B show a system configuration, e.g., when the system is used for wall surface linearity monitoring such as wall surface deformation generation monitoring. With this configuration, when the hubs are connected in cascade, the system can be formed with the single cable 5 as shown in the drawings.

An example of a GPS receiver for use in the GPS receiving system of the embodiment 1 will be explained. A GPS receiver 1 has an antenna I/F 11, a GPS transceiver 12, a GPS receiver part 13, a GPS position measuring computation/control part 14, a LAN I/F 15 and a hub 16, and the GPS receiver 1 is also provided with an antenna 2, as shown in FIG. 2. The antenna I/F 11 is provided between the antenna 2 for reception of electromagnetic wave from a GPS satellite and the GPS transceiver 12. The GPS receiver part 13 performs reception control of GPS data from the GPS satellite. The GPS position measuring computation/control part 14 performs position calculation on the basis of the GPS data. The LAN I/F 15, which is compatible with an Ethernet (bus type network LAN), performs input/output control over the GPS data logging PC and GPS position measuring computation/control part 14. The hub 16 has a 10BASE-2 port 17 and a 10BASE-T port 18.

A flow of data processing operations in the embodiment 1 will be explained with use of a flowchart of the data processing operations of a GPS receiver having an LAN I/F built therein in FIG. 3. The GPS receiver starts with a step 600. In a step 601, the GPS receiver receives a function command from the GPS data logging PC in a packet data receiving mode where packet data is sent from the PC. In a step 602 of data control processing, the GPS receiver judges the type of the command. In a step 603, the GPS receiver determines the processing operation based on the command type to judge whether or not the contents of the command indicate a receiver setting/initializing command. If so the GPS receiver proceeds to a step 604; while if not then the GPS receiver goes to a step 610. In the step 604, the GPS receiver performs the GPS receiver setting/initializing operation. In a step 605, the GPS receiver judges whether or not position measuring conditions are satisfied such as whether or not the GPS receiver has received the same number of GPS satellite electromagnetic waves as the number of GPS satellites to be captured necessary for performing position measuring calculation. If the position measuring conditions are satisfied, then the GPS receiver proceeds to a step 606. If the conditions are not satisfied, then the GPS receiver returns to the step 605. In the step 606, the GPS receiver performs GPS data receiving operation. In a step 607, the GPS receiver executes the position measuring operation for position calculation. In a step 608, the GPS receiver performs position measuring data transmitting operation to transmit a position computation result to the LAN I/F. In a step 609, the GPS receiver executes position-measuring data packet transmitting operation to transmit data to a LAN and returns to the step 601. In a step 610, the GPS receiver judges whether or not the command is a status inquiry command to inquire the GPS status. If the command is of the status inquiry, then GPS receiver proceeds to a step 611; while if not then the GPS receiver performs abnormality processing operation. In the step 611, the GPS receiver performs transmitting operation of the GPS status information. In a step 612, creates a status data packet to transmit status data to the LAN and returns to the step 601.

Through the flow of operations mentioned above, data processing can be carried out.

Explanation will be made as to an exemplary modification of the GPS receiver for use in the embodiment 1. The GPS receiver of the present modification is the CAN I/F built-in GPS receiver 1 which includes an antenna I/F 11, a GPS transceiver 12, a GPS receiver part 13, a GPS position measuring computation/control part 14, and a CAN I/F (device net) 19, and an antenna 2 is mounted to the GPS receiver, as shown by a block diagram in FIG. 4. The antenna I/F 11, GPS transceiver 12, GPS receiver part 13 and GPS position measuring computation/control part 14 are substantially the same as those in the GPS receiver of FIG. 2 compatible with the hub-built-in Ethernet, and thus detailed explanation thereof is omitted. The CAN I/F 19 performs input/output control between the GPS data logging PC and GPS position measuring computation/control part 14.

An embodiment 2 will be explained. A GPS receiving system of the present embodiment is of a 10BASE-T built-in hub connection type and for example, performs slant surface multi-point monitoring operation as shown in FIGS. 5A and 5B. In the case of the slant surface multi-point monitoring, such an arrangement as to position GPS receivers on the slant surface at many points is required, and such necessary points are connected in the form of a star type connection LAN based on the GPS receiver built-in hub. And connection between the star type connection LAN's is made by means of 10BASE-T. Thereby a plurality of star type LAN hubs can be interconnected by means of the single cable 5.

An embodiment 3 will be explained. A GPS receiving system of the present embodiment is of a 10BASE-2 connection type and for example, performs wall surface linearity monitoring as shown in FIGS. 6A and 6B. With this structure, the system is a bus connection type LAN where a 10BASE-2 cable 5 is connected between adjacent ones of a plurality of GPS receivers 1a to 1d. In this system, a LAN can be formed only by routing the single 10BASE-2 coaxial cable 5.

An embodiment 4 will be explained. A GPS receiving system of the present embodiment is of a 10BASE-2 connection type and for example, performs slant surface multi-point monitoring as shown in FIGS. 7A and 7B. In the case of the slant surface multi-point monitoring, such an arrangement as to position GPS receivers on the slant surface at many points, and such necessary points are connected in the form of a 10BASE-T star type connection LAN based on a GPS receiver built-in hub. And connection between the star type connection LAN's is carried out by means of the 10BASE-2 cable. Thereby connection between a plurality of star type LAN hubs is made by means of the single LAN cable 5.

An embodiment 5 will be explained. A GPS receiving system of the present embodiment uses a GPS receiver compatible with a hub-built-in Ethernet, which is shown by a block diagram in FIG. 8. The 10BASE-2 port 17 of the GPS receiver 1 compatible with the hub built-in Ethernet is used when a bus connection type LAN is to be formed. In practice, connection is carried out with use of T type branch connectors 51 so that, in the case of a 10BASE-2 compatible device 41, the device can similarly be directly connected to the T type branch connector 51, which corresponds to a group of devices 4a. 10BASE-2 compatible devices 41a to 41c are connected with use of the T type branch connectors 51, which corresponds in contents to the configuration shown in FIGS. 6A and 6B. Similarly, a group of devices 4b and 4c correspond to the configuration shown in FIGS. 7A and 7B. Further, the 10BASE-T port 18 of the GPS receiver 1 compatible with the hub built-in Ethernet is used when a star type LAN is formed. A group of devices 4d corresponds to the configuration shown in FIGS. 1A and 1B. Groups of devices 4e and 4f correspond to the configuration shown in FIGS. 5A and 5B.

Although explanation has been made in connection with the GPS receiving system and GPS receiver in the foregoing embodiments, software for causing a computer to externally receive an initializing command and a data acquisition command to the GPS receiver to control the GPS receiver can be stored or recorded in computer-readable recording medium (for example, CD-ROM or the like). And when the recording medium is used, a conventional GPS receiver for example can be made to function as the GPS receiver in the GPS receiving system of the present invention.

In accordance with the foregoing embodiments, when GPS is used in such a monitoring system as to monitor positions with use of a plurality of GPS receivers, such a communication system as to be able to avoid the restriction of the 1:1 communication can be used and there can be obtained a GPS receiving system which realizes wiring saving of LAN cable at the time of forming a LAN.

What is claimed is:

1. A Global Positioning System (GPS) receiving system comprising:

a plurality of GPS receivers having GPS antennas mounted thereto;

a GPS data processing apparatus; and a cable for connection between said GPS receivers and said GPS data processing apparatus, wherein each GPS receiver is provided with a LAN interface I/F other than a RS-232C communication port in its input/output I/F, wherein each GPS receiver is provided with an Ethernet I/F in its input/output I/F, wherein each GPS receiver incorporates a hub including a 10BASE-T port and a 10BASE-2 port, wherein the hubs of the GPS receivers are connected in a cascade configuration, thereby allowing the GPS receiving system to be configured with a single 10BASE-T cable.

2. A Global Positioning System (GPS) receiving system as set forth in claim 1, wherein said GPS receiver has software for externally receiving an initializing command and a data acquisition command in each of said GPS receivers to control the GPS receiver.

3. A Global Positioning System (GPS) receiving system as set forth in claim 1, wherein said GPS receiver is provided with software for externally receiving an initializing command and a data acquisition command to the GPS receiver via a LAN I/F of an input/output I/F to control the GPS receiver.

4. A Global Positioning System (GPS) receiving system as set forth in claim 1, wherein said GPS receiver is provided with software for externally receiving an initializing command and a data acquisition command to the GPS receiver via a LAN I/F of an input/output I/F to control the GPS receiver.

5. A Global Positioning System (GPS) receiving system as set forth in claim 1, wherein said GPS receiver is provided with software for externally receiving an initializing command and a data acquisition command to the GPS receiver via a LAN I/F of an input/output I/F to control the GPS receiver.

6. A Global Positioning System (GPS) receiver in a GPS receiving system comprising:

a plurality of GPS receivers having GPS antennas mounted thereto;

a GPS data processing apparatus; and a cable for connection between said GPS receivers and GPS data processing apparatus, wherein a LAN I/F is provided with an Ethernet I/F, wherein each GPS receiver is provided with an Ethernet I/F in its input/output I/F, wherein each GPS receiver incorporates a hub including a 10BASE-T port and a 10BASE-2 port, and wherein the hubs of said GPS receivers are connected in cascade configuration, thereby allowing the GPS receiving system to be configured with a single 10BASE-T cable.

7. A Global Positioning System (GPS) receiver in a GPS receiving system comprising:

a plurality of GPS receivers having GPS antennas mounted thereto;

a GPS data processing apparatus; and a cable for connection between said GPS receivers and GPS data processing apparatus, wherein a LAN I/F is provided with a CAN I/F, wherein each GPS receiver is provided with an Ethernet I/F in its input/output I/F, wherein each GPS receiver incorporates a hub including a 10BASE-T port and a 10BASE-2 port, wherein the hubs of said GPS receivers are connected in cascade configuration, thereby allowing the GPS receiving system to be configured with a single 10BASE-T cable.

8. A computer-readable recording medium having a program recorded thereon for use in a Global Positioning System (GPS) receiving system including a plurality of GPS receivers having GPS antennas mounted thereto, a GPS data processing apparatus, and a cable for connection between said GPS receivers and GPS data processing apparatus, said program when executed causes the GPS receiving system to perform the steps of:

externally receiving an initializing command and a data acquisition command in a GPS receiver via a LAN I/F of an input/output I/F, wherein each GPS receiver is provided with an Ethernet I/F in its input/output I/F, wherein each GPS receiver incorporates a hub including a 10BASE-T port and a 10BASE-2 port, wherein the hubs of said GPS receivers are connected in cascade configuration, thereby allowing the GPS receiving system to be configured with a single 10BASE-T cable.

9. A (Global Positioning System (GPS) receiving system comprising:

a plurality of GPS receivers having GPS antennas mounted thereto;

a GPS data processing apparatus; and a cable for connection between said GPS receivers and said GPS data processing apparatus, wherein each GPS receiver is provided with a LAN interface (I/F) other than a RS-232C communication port in its input/output I/F, wherein each GPS receiver is provided with an Ethernet I/F in its input/output I/F, wherein each GPS receiver incorporates a hub including a 10BASE-T port and a 10BASE-2 port, wherein the hub of said GPS receivers are connected in a star type configuration by a 10BASE-T cable 5.

10. A (Global Positioning System (GPS) receiving system comprising:

a plurality of GPS receivers having GPS antennas mounted thereto;

a GPS data processing apparatus; and a cable for connection between said GPS receivers and said GPS data processing apparatus, wherein each GPS receiver is provided with a LAN interface (I/F) other than a RS-232C communication port in its input/output I/F, wherein each GPS receiver is provided with an Ethernet I/F in its input/output I/F, wherein each GPS receiver incorporates a hub including a 10BASE-T port and a 10BASE-2 port, wherein the hub of said GPS receivers are connected in a bus type configuration where adjacent GPS receivers are connected with a 10BASE-2 cable.

11. A (Global Positioning System (GPS) receiving system comprising:

a plurality of GPS receivers having GPS antennas mounted thereto;

a GPS data processing apparatus; and a cable for connection between said GPS receivers and said GPS data processing apparatus, wherein each GPS receiver is provided with a LAN interface (I/F) other than a RS-232C communication port in its input/output I/F, wherein each GPS receiver is provided with an Ethernet I/F in its input/output I/F, wherein each GPS receiver incorporates a hub including a 10BASE-T port and a 10BASE-2 port, wherein the hubs of said GPS receivers are connected in a 10BASE-T star type configuration where adjacent GPS receivers are connected with a 10BASE-2 cable.

* * * * *